(12) United States Patent
Sahoo

(10) Patent No.: US 11,112,330 B2
(45) Date of Patent: Sep. 7, 2021

(54) MEASURING CONTAMINATION TO DETERMINE LEAK LOCATION

(71) Applicant: Itron, Inc., Liberty Lake, WA (US)

(72) Inventor: Premananda Sahoo, Kaggadasapura (IN)

(73) Assignee: Itron, Inc., Liberty Lake, WA (US)

( * ) Notice: Subject to any disclaimer, the term of this patent is extended or adjusted under 35 U.S.C. 154(b) by 180 days.

(21) Appl. No.: 16/454,625

(22) Filed: Jun. 27, 2019

(65) Prior Publication Data

US 2019/0323918 A1    Oct. 24, 2019

Related U.S. Application Data

(63) Continuation of application No. PCT/US2017/067827, filed on Dec. 21, 2017.

(30) Foreign Application Priority Data

Dec. 28, 2016 (IN) .............................. 201641044713

(51) Int. Cl.
| | | |
|---|---|---|
| *G01M 3/28* | (2006.01) | |
| *E03B 7/00* | (2006.01) | |
| *G01M 3/22* | (2006.01) | |

(52) U.S. Cl.
CPC ........... *G01M 3/2815* (2013.01); *E03B 7/003* (2013.01); *G01M 3/22* (2013.01)

(58) Field of Classification Search
CPC ...... G01M 3/00; G01M 3/22; G01M 3/26–28; G01M 3/2815; E03B 7/00–07; E03B 7/003
See application file for complete search history.

(56) References Cited

U.S. PATENT DOCUMENTS

| | | | |
|---|---|---|---|
| 9,928,720 B2 | 3/2018 | Cornwall | |
| 9,939,341 B2* | 4/2018 | McNab | ................... G01M 3/38 |
| 10,948,131 B1* | 3/2021 | Francis | ................... G01M 3/26 |

(Continued)

FOREIGN PATENT DOCUMENTS

| | | |
|---|---|---|
| EP | 2477088 | 7/2012 |
| WO | WO2009075082 | 6/2009 |

(Continued)

OTHER PUBLICATIONS

PCT Search Report dated Mar. 28, 2018 for PCT application No. PCT/US2017/067827, 19 pages.

(Continued)

*Primary Examiner* — Nguyen Q. Ha
(74) *Attorney, Agent, or Firm* — Lee & Hayes, P.C.

(57) ABSTRACT

Techniques for determining a location of a leak in a water distribution system are described herein. In some examples, a remote leak detection service and/or a leak detection device may receive measurements from a pressure sensor, a contamination sensor, and a flow rate sensor positioned along the water distribution system. Based on a difference in time between a change in pressure detected by the pressure sensor and a subsequent change in contamination detected by the contamination sensor, the flow rate measured by the flow rate sensor, and dimensions of the water distribution system, the remote leak detection system may determine the location of the leak.

20 Claims, 6 Drawing Sheets

(56) References Cited

U.S. PATENT DOCUMENTS

| | | |
|---|---|---|
| 2006/0248032 A1 | 11/2006 | Jellum et al. |
| 2009/0018782 A1 | 1/2009 | Sameda et al. |
| 2009/0240445 A1 | 9/2009 | Umekage et al. |
| 2010/0156632 A1 | 6/2010 | Hyland et al. |
| 2011/0254696 A1 | 10/2011 | Cornwall et al. |
| 2012/0111799 A1 | 5/2012 | Lemoine et al. |
| 2012/0174655 A1 | 7/2012 | Essich |
| 2013/0096857 A1 | 4/2013 | Chakradhar |
| 2013/0204399 A1 | 8/2013 | Donaldson et al. |
| 2014/0207392 A1 | 7/2014 | Cornwall |
| 2016/0001114 A1* | 1/2016 | Hyland .................. G01D 4/004 73/168 |
| 2019/0323918 A1 | 10/2019 | Sahoo |

FOREIGN PATENT DOCUMENTS

| | | |
|---|---|---|
| WO | WO2010111699 | 9/2010 |
| WO | WO2012106709 | 8/2012 |
| WO | WO2012156758 | 11/2012 |

OTHER PUBLICATIONS

Segura, "Use of hydroinformatics technologies for real time water quality management and operation of distribution networks. Case sutdy of Villavicencio, Colombia", Mar. 1, 2006, Delft, Netherlands, retrieved from the internet at URL:https://www.un-ihe.org/sites/default/files/leonardo_alfonso_msc.pdf on Mar. 20, 2018, 112 pages.

Office action for U.S. Appl. No. 13/747,295, dated Jan. 19, 2017, Cornwall, "System to Identify Gas Usage by Appliance", 24 pages.

Office action for U.S. Appl. No. 13/747,295, dated Nov. 18, 2015, Cornwall, "System to Identify Gas Usage by Appliance", 14 pages.

Office action for U.S. Appl. No. 13/747,295, dated Mar. 4, 2016, Cornwall, "System to Identify Gas Usage by Appliance", 12 pages.

PCT Search Report and Written Opinion dated Apr. 8, 2014 for PCT Application No. PCT/US13/68213, 9 Pages.

\* cited by examiner

MEASURING CONTAMINATION TO DETERMINE LEAK LOCATION

RELATED APPLICATIONS

This application claims priority to and is a continuation of PCT Patent Application No. PCT/US17/67827 filed on Dec. 21, 2017, and is related to and claims priority to India Patent Application No. 201641044713, filed on Dec. 28, 2016, the entire contents of which are incorporated herein by reference.

BACKGROUND

Water distribution systems include large networks of pipes located primarily underground which transport water to consumers. Generally, high water pressure in these distribution systems ensures that contaminants from exterior the pipes are unable to enter the system of pipes due to the constant, positive pressure from the inside of the pipes to the surrounding soil. When leaks occur in these systems, water can exit from interior the pipes through the leaks and saturate the surrounding soil near the leak. When heavily saturated, the soil near the leak has a relatively high water pressure. High water pressure in the surrounding soil may not be a problem in water distribution systems which maintain a constant, high water pressure as the pressure in the pipe remains at a higher pressure than the water in the saturated soil. However, in some locations water distribution systems suffer from intermittent drops in water pressure due to power outages, demand that exceeds supply, leaks, and other factors. During these periods when water distribution systems experience intermittent drops in pressure, water in the saturated soil near broken pipes may flow back into the system by reentering the broken pipe. The water that flows back into the water distribution system from the saturated soil may include contaminants that make water unsafe for use and consumption.

To determine locations of leaks in a water distribution system without having to dig up extensive portions of the water distribution system to examine the pipes, water providers use various leak detection techniques, such as by measuring acoustic pressure waves. While these techniques may be useful for water distribution systems with consistently high pressure, they do not provide accurate results for partially or intermittently pressurized systems.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
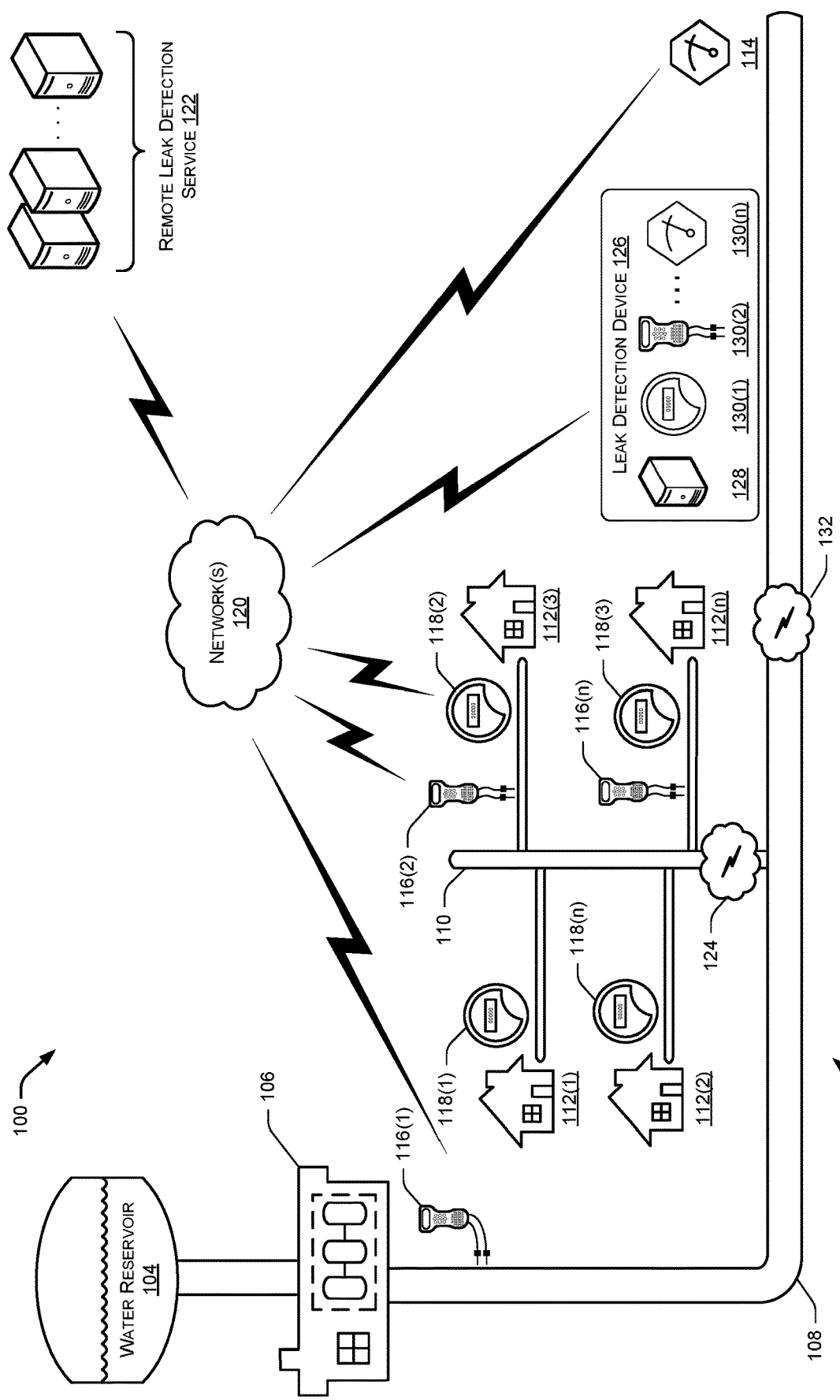
FIG. 1 is a schematic diagram of an example environment including a water distribution system in which various sensors take measurements of the water distribution system that are then used to determine a location of a leak in the water distribution system by operation of a remote leak detection service and/or a leak detection device.

As discussed above, partially, or intermittently pressurized water distribution systems may experience water flow back into the system through leaks that are surrounded by saturated soil which contains pressurized and contaminated water. Water providers who manage these water distribution systems need to determine a location of these broken pipes to fix the broken pipes. However, digging up extensive portions of a water distribution system is costly and time intensive. While various techniques exist for determining leak locations in consistently high pressure water distribution systems, water providers currently lack an efficient, non-intrusive, and cost effective way of determining locations of leaks in partially, or intermittently, pressurized water distribution systems.

This application describes techniques for determining locations of leaks in partially, or intermittently, pressurized water systems (e.g., any pressurized distribution system where contaminants are given an opportunity to enter through a broken pipe). Using the techniques described herein, a water provider can accurately determine locations of leaks in a water distribution system that experiences partial and/or intermittent loss in pressure. The techniques described herein contemplate the use of inexpensive, non-intrusive sensors to measure pressure, flow rates, and contamination in a water distribution system and determine locations of leaks based on the measurements captured by these sensors. While the techniques described herein are with respect to water distribution systems, the techniques are equally applicable to any type of distribution system for distribution fluids (e.g., oil) which experience leaks.

Generally, the techniques described herein employ the use of a pressure sensor to detect a change in pressure in a water distribution system, such as a drop in pressure. The drop in pressure may be low enough to allow contaminants to enter the system through a broken pipe. Based on detecting the change in pressure, one or more contamination sensors may take measurements to identify a rise in contamination in the water system subsequent the pressure drop, which indicates that contaminants which entered during the pressure drop have flowed through the system to the contamination sensors. Further, flow measurements may be taken before and/or after the pressure drop to determine an amount of water that has flown through the water distribution system. Based on the difference in time between when the pressure dropped to allow contaminants to enter the system and the time when an increase in contaminants was detected by the contamination sensors, and the amount of water that moved through the water distribution determined by the flow rate and dimensions of pipes in the water distribution system, a location of a broken pipe or leak may determined. For instance, a distance from the contamination sensor which detects the rise in contamination to a location upstream associated with the broken pipe may be determined, and that distance may be used to determine a location on the water distribution system of a broken pipe.

A variety of sensors may be positioned on a water distribution system to take measurements to provide data usable to determine a location of a leak in the water distribution system. The sensors may include one or more pressure sensors to measure pressure in the water distribution system, one or more flow rate sensors to measure water flow rates in the system (e.g., velocity, volumetric flow rate, etc.), and one or more contamination sensors to measure contamination in the system (e.g., total dissolved solids, bacteria, chemicals, or any other alien material observed in a distribution system). The sensors may further be communicatively coupled to a remote leak detection service, such as over one or more networks, to send the measurements to the remote leak detection service (e.g., cloud-based service, network-based service, utility service, central office, etc.). The remote leak detection service may include one or more modules to determine, based on the measurements, a location of a break within the water distribution system. The techniques described below describe the use of a remote leak detection service. However, some implementations contemplate that some or all of the techniques described below may be performed by a portable or static leak detection device positioned on or near the water distribution system.

The water distribution system may have one or more pressure sensors to measure pressure in the water distribution system. For example, a pressure sensor may periodically, or continuously, measure pressure and/or pressure changes in the water distribution system. The pressure sensor may further timestamp the measurements taken to indicate when the measurements were taken. The pressure sensor may then communicate these measurements and timestamps to the remote leak detection service. In some examples, the pressure sensor may further be communicatively coupled to the one or more contamination sensors located on the water distribution system, such by a network, and send the pressure measurements to the contamination sensors. The pressure sensors may send messages or other indicators (e.g., beacons, alerts, etc.) to the contamination sensors based on, or in response to, detecting a change in pressure in the water distribution system. In some instances, the pressure change indication may be routed through the remote leak detection service and to the contamination sensors.

One or more contamination sensors may be positioned along a water distribution system to periodically, or consistently, take measurements of contaminants in the water distribution system. In some examples, to conserve battery power, the contamination sensors may be in an idle state where they do not obtain contamination measurements. In response to receiving a pressure change indication or pressure measurements from the pressure sensor which indicate a change in pressure in the water distribution system, the contamination sensors may exit the idle state and begin to continuously, or periodically, take measurements of the contaminants in the water distribution system. The contamination sensors may continue to take measurements for a period of time and timestamp when the measurements were taken, and relay data representing the contamination measurements and the timestamps to the remote leak detection service.

In some examples, one or more flow rate sensors may be positioned on the water distribution system to measure flow rates of fluid in the system, timestamp the measurements, and send the flow rate measurements and timestamps to the remote leak detection service. In various examples, the flow rate sensors may be metering units used for measuring total flow rates over time and/or usage of water in a billing cycle for consumers whose measurements may be sent to the remote leak detection service. In other examples, the flow rate sensors may also reside in an idle state until an indication of a pressure change is received, at which point a single flow rate measurement, or continuous/periodic flow measurements may be taken for the water distribution system. The flow rate sensor may then send the flow rate measurements to the remote leak detection service.

The remote leak detection service may include one or more modules to determine, based on the measurements received from the sensors and the timestamps for the measurements, a location of a leak in the water distribution system. As described above, a change in water pressure, such as a drop in water pressure, may result in pressurized water held in saturated soil outside a broken pipe to reenter the water distribution system through the broken pipe causing a leak. Thus, a change in water pressure may indicate that contaminated water has entered the water distribution system through a hole in a pipe. The modules of the remote leak detection service may analyze the pressure measurements and associated timestamps to determine a point in time where a pressure change occurred. Further, the modules may analyze the contamination measurements and associated timestamps to determine another point in time subsequent the pressure change where the contamination measurements indicate a rise in contamination in the water distribution system. The modules may determine a time difference between the point in time where the pressure changed and the point in time where the contamination measurements indicated a rise in contamination. Additionally, the modules may analyze the flow rate measurements to identify a flow rate of the water distribution system. Based on the difference in time and the flow rate, the modules may determine a distance from the contamination sensor where a leak in a pipe allowed contaminants to enter the water distribution system during the drop in pressure. Further, the remote leak detection service may store data indicating a topology and dimensions for the water distribution system and, based on the location of the contamination sensor and the distance from the contamination sensor where the leak in the pipe exists, determine an absolute location in the water distribution system where the leak in the pipe exists.

While the techniques described above may be performed using a single contamination sensor, in some examples the techniques include the use of multiple contamination sensors. For instance, timestamped measurements from multiple contamination sensors may be used to determine distances from each contamination sensor at which a leak is determined to exist. By creating a composite of the determined distances, or by averaging the determined distances, a more accurate estimated leak location may be determined.

In some examples, the operations described herein may be performed in whole, or in part, by a portable or static leak detection device located on the water distribution system. For instance, a leak detection device may include one or more of a pressure sensor, a flow rate sensor, and/or a contamination sensor. In various examples, one or more sensors may be communicatively coupled to the leak detection device, such as through wired connections or over a network, and receive measurements from the one or more sensors. In either example, the leak detection device may receive, detect, or otherwise obtain measurements from the pressure sensor, the contamination sensor, and the water flow sensor and perform operations for detecting a location of a leak in the water distribution system. In some examples, the leak detection device may simply relay or send raw data including the measurements to the remote leak detection service. In other examples, the leak detection device may comprise one or more modules to perform operations similar to those performed by the modules of the leak detection device to determination a distance from the contamination sensor. For instance, the leak detection device may store data indicating topology and/or dimensions of the water distribution system and determine a distance from where the contamination sensor measurement was taken to a point on the pipe where the leak exists. In some examples, the leak detection device may relay or send this distance determination to the remote leak detection service.

While the examples given herein are described primarily in the context of a network in which sensors are arranged in direct communication with a remote leak detection service, in other examples, aspects of the techniques described herein may also apply to networks in which communications and measurements are transmitted through one or more intermediary nodes or endpoints before being transmitted to a leak detection service.

Example Architecture

FIG. 1 is a schematic diagram of an example environment 100 of a water distribution system 102 in which various sensors take measurements from the water distribution system which are used to determine a location of a leak in the water distribution system by a remote leak detection service and/or a leak detection device. For instance, a time difference between a pressure change and a contamination change in the water distribution system may be determined using pressure sensor data and contamination sensor data. Additionally, flow rate data and/or pipe dimension data for the water distribution system may be determined. Using the time difference and an amount of water that moved through the water distribution system subsequent the pressure drop, a location of a broken pipe may be estimated or determined.

The environment 100 includes a water reservoir 104 (e.g., well, natural or artificial lake, storage pond, water tower, etc.) which feeds water to a treatment plant 106 to treat the water for consumption or use by users of the water distribution system. The treated water may then be distributed by a primary distribution system 108 and/or a secondary distribution system 110 to distribute water to consumers 112 (e.g., 112(1), 112(2), 112(3), 112(n), etc.).

In some examples, the water distribution system 102 may have various sensors positioned thereon, such as a pressure sensor 114, one or more contamination sensors 116 (e.g., 116(1), 116(2), 116(n), etc.), and one or more flow rate sensors 118 (e.g., 118(1), 118(2), 118(3), 118(n), etc.). The sensors may be configured with radios or other communication means to communicate the measurements and other data (e.g., timestamps) over one or more networks 120 to a remote leak detection service 122. The network(s) 120 may include any of or a combination of multiple different types of networks, such as cellular networks, wireless networks, Local Area Networks (LANs), Wide Area Networks (WANs), Wireless Local Area Networks (WLANs), Personal Area Networks (PANs), and/or the Internet.

While illustrated as a single pressure sensor 114, in various examples multiple pressure sensors 114 may be located on the water distribution system 102 to measure pressure. In some examples, the pressure sensor 114 may continuously, or periodically, measure the pressure in the water distribution system and timestamp the measurements. The water pressure sensor may further be configured to detect a change in pressure, such as a drop in pressure, and send data representing that drop in pressure to the contamination sensor(s) 116 as well as the timestamps taken for that data. For instance, the pressure sensor 114 may determine the pressure in the water distribution system 102 dropped at a point in time, and send a notification to the contamination sensor(s) 116 indicating the pressure drop and the time at which the pressure drop occurred. This pressure drop may allow contaminants to enter the water distribution system 102 through a broken pipe through which water earlier escaped. In other instances, the pressure sensor 114 may simply transmit the measurements taken to the contamination sensor(s) 116 in real-time or near real-time which are configured to analyze the measurements to determine a drop in pressure. Further, the pressure sensor 114 may send the pressure measurements and associated timestamps to the remote leak detection service 122. In some instances, the pressure sensor 114 may send some, or all, of the measurements taken to the remote leak detection service 122, while in other instances, the pressure sensor 114 may send a measurement or other data representing a change in pressure and a timestamp associated with the change in pressure to the remote leak detection service 122.

In various examples, the contamination sensor(s) 116 located on the water distribution system 102 may be configured to continuously, or periodically, take contamination measurements of the water in the system to determine contamination levels (e.g., total dissolved solids, bacteria, chemicals, or any other alien materials). In some examples, the contamination sensor(s) 116 may be idle (e.g., not actively taking measurements) to conserve battery power. The contamination sensor(s) 116 may include a radio or other communication means to receive data, such as over network(s) 120, from the pressure sensor 114 indicating a change in pressure in the water distribution system 102. Based on the indication of the change in pressure, or responsive to receiving or identifying the change in pressure, the contamination sensor(s) 116 may take one or more contamination measurements and timestamp the measurements. After a threshold period of time (e.g., an amount of time for water to enter and leave the water distribution system 102), the contamination sensor(s) 116 may stop taking measurements and send the contamination measurements and the associated timestamps to the remote leak detection service 122.

In some examples, the water distribution system 102 may further have the flow rate sensor(s) 118 positioned thereon to take flow rate measurements (e.g., velocity, volumetric flow rate, etc.) for the water in the system and timestamp the measurements. In some instances, the flow rate sensor(s) 118 may be metering units used to measure consumption for the respective consumer(s) 112. The flow rate sensor(s) 118 may be configured to communicate the flow rate measurements and the associated timestamps to the remote leak detection service 122, such as by a radio using the network(s) 120, or by a meter reader.

In various examples, the remote leak detection service 122 may be configured to receive the measurements or other data from the pressure sensor 114, the contamination sensor(s) 116, and the flow rate sensor(s) 118. The remote leak detection service 122 may determine, based on the measurements and associated timestamps, a location of a leak 124 in the water distribution system 102, as further discussed in FIGS. 2 and 3. Upon determining the location of the leak 124, the remote leak detection service 122 may take various actions, such as outputting the location on a display located at the remote leak detection service 122, and/or send a notification to another computing device indicating the location of the leak (e.g., a field device operated by a repair service).

In various examples, a leak detection device 126 may be positioned on or near the water distribution system 102 and include a computing unit 128 configured to receive data from one or more sensors 130 (e.g., flow rate sensor 130(1), contamination sensor 130(2), and/or pressure sensor 130($n$)) and determine a location of a leak 132 along the water distribution system 102. For example, the computing unit 128 of the leak detection device 126 may receive time-stamped measurements from the pressure sensor 130($n$) indicating a change in pressure, timestamped measurements from the contamination sensor 130(2) indicating a change in contamination in the water distribution system 102, and flow rate measurements from the flow rate sensor 130(1). Based on the measurements, the leak detection device 126 may determine a distance from the leak detection device 126 where the contamination measurements were taken to the leak 134 using similar techniques as the remote leak detection service 122, discussed below in FIGS. 2-4. In various examples, the leak detection device 126 may include a radio to transmit the determined length to the remote leak detection service 122. In some instances, the leak detection device may simply transmit the measurements without performing and calculations to determine the distance from the device 126 at which the leak 132 exists. While the sensors 130 illustrated as being included in a housing of the leak detection device 126, in some examples, one or more of the sensors 130 may be exterior to, but communicatively attached to, the leak detection device 126.

In some examples, one or more of the contamination sensor(s) 116 may be each be integrated with a respective pressure sensor, such as pressure sensor 114. For instance, the contamination sensor(s) 116 may be included in the same device as the pressure sensor 114 which contains logic to coordinate the collecting activities of the contamination sensor 116 and the pressure sensor. For instance, the pressure sensor 114 may detect a change in pressure in the water distribution system 102, and be coordinated with the respective contamination sensor 116 to cause the contamination sensor 116 to take measurements. In this way, more accurate data collection may be performed, such as by having more accurate triggering of the contamination sensor 116 based on detected changes in pressure by the pressure sensor 114.

Example Remote Leak Detection Service

Figure 2:
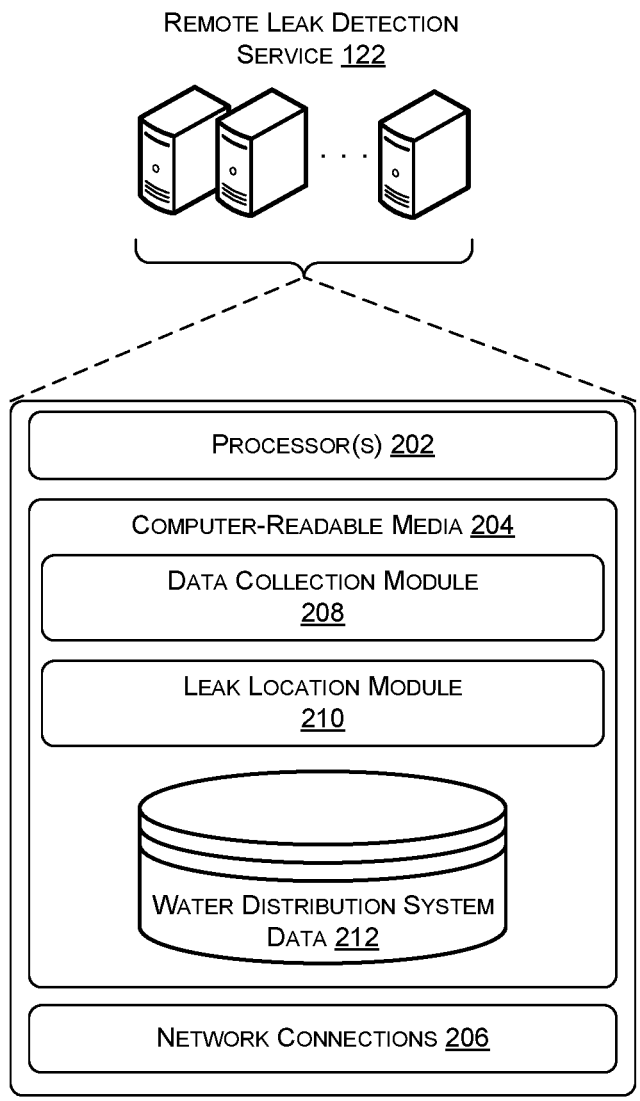
FIG. 2 is a functional block diagram of selected components implemented at a remote leak detection service, such as the remote leak detection service of FIG. 1.

FIG. 2 is a functional block diagram of selected components implemented at a remote leak detection service, such as the remote leak detection service 122 of FIG. 1. For instance, a time difference between a pressure change and a contamination change in the water distribution system may be determined using pressure sensor data and contamination sensor data. Additionally, flow rate data and/or pipe dimension data for the water distribution system may be determined. Using the time difference and an amount of water that moved through the water distribution system subsequent the pressure drop, a location of a broken pipe may be estimated or determined.

The leak detection service 122 may include one or more servers or other computing devices, which may be located in a single location or in multiple, distributed locations. The leak detection service 122 may comprise one or more processors 202, computer-readable media 204, and one or more network connections 206. The network connections 206 may include one or more network interface controllers (NICs) or other types of transceiver devices to send and receive communications over a network, such as network(s) 120.

The computer-readable media 204 may include computer-readable instructions which, when executed by the processor(s) 202, cause the remote leak detection service 122 to perform functions that may include some or all the functions described herein. The computer-readable media 204 may include software functionality configured as one or more "modules." However, the modules are intended to represent example divisions of the software for purposes of discussion, and are not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.).

In some examples, the computer-readable media 204 may include a data collection module 208 and leak location module 210 comprising computer-executable instructions that, when executed by the processor(s) 202, determine a location of a leak in a water distribution system, such as water distribution system 102, based on measurements received from various sensors. The data collection module 208 may be configured to collect and/or store data received from various devices, sensors, or endpoints, such as pressure sensor 114, contamination sensors(s) 116, flow rate sensor(s) 118, and/or leak detection device 126. For instance, the data collection module 208 may receive measurements collected by these various sensors and associated timestamps. The measurements may be received when the sensors send the data, or based on a reporting schedule determined for the various sensors and devices.

The leak location module 210 may comprise computer-readable instructions that, when executed by the processor(s) 202, perform various operations for determining a location of a leak in a water distribution system. In various examples, the leak location module 210 may analyze measurements sent from the pressure sensor 114 and determine a change in pressure in the water distribution system 102, such as a drop in water pressure that is more than a predefined threshold drop in pressure. Additionally, or alternatively, the change in pressure may be associated with an increase in pressure. For instance, if the water distribution system 102 experiences an outage where water is no longer being pumped through the system, the contaminants may not be moving, or moving slowly, through the system 102. Responsive to an increase in pressure, the contaminants may start moving, at which point contamination measurements may begin to be taken. The leak location module 210 may further analyze one or more timestamps associated with the change in pressure to determine a time at which the change in pressure occurred. Further, the leak location module 210 may analyze measurements taken by and sent from the contamination sensor(s) 116. The leak location module 210 may determine that a change in contamination (e.g., an increase in the contamination of the water distribution system 102) occurred at another time subsequent to the time at which the change in pressure was detected based on timestamps associated with the contamination measurements.

In some examples, the change in contamination may be detected based on a threshold contamination value determined for the water distribution system 102. For instance, the contamination sensor(s) 116 may periodically take contamination measurements during periods of normal (e.g., high) pressure operating conditions. These contamination measurements may serve as a reference as to what "normal" contamination measurements look like for water in the system 102. In some instances, a contamination sensor near the treatment plant 106, such as contamination sensor 116(1), may be used to determine the reference values or measurements. In this way, the leak location module 210 may determine that a change in contamination has occurred by comparing measurements taken subsequent the pressure change to the reference contamination measurement.

In various instances, the leak location module 210 may determine a time difference between the time at which the pressure change occurred and the time at which the contamination change occurred. Further the leak location module 210 may analyze measurements taken by the flow rate sensor(s) 118 to determine an average flow rate in the water distribution system 102, or a flow rate at a particular time, such as the flow rate at a time between the pressure change and the contamination change. The flow rate may indicate how much water has moved between a break in a pipe of the water distribution system 102 and a contamination sensor 116 that measured the change in contamination for the time between the pressure change and contamination change. In various examples, measurements taken by a flow rate sensor(s) 118 near the contamination sensor(s) 116 which took the contamination measurements may be used to determine the flow rate.

The leak location module 210 may be configured to determine a distance from the contamination sensor(s) 116 which detected the contamination change to a leak in the water distribution system 102 based at least in part on the time difference between when the pressure change occurred and the contamination change occurred, and the flow rate measurement(s). To determine this distance, the leak location module 210 may analyze water distribution system data 212 stored in the in the computer-readable media 204 of the remote leak detection service 122. The water distribution data 212 may generally comprise data which specifies the layout of the water distribution system 102, such as the layout of the pipes and the dimension of the pipes in the system 102.

In some examples, the length may be determined using the equation $l = V/\pi r^2$, where l is the distance from the contamination sensor(s) 116 which detected the change in the contamination, V is the volume of the water that has flown between the leak and the contamination sensor(s) 116 determine based on the flow rate measurements, and r is the radius of the pipe upstream from the contamination sensor(s) 116. While there are other equations that may be used to determine the length of a pipe (e.g., distance) extending from the contamination sensor to the break in the pipe, this is one illustrative implementation to determine the length (l) from the contamination sensor(s) 116 at which the leak exists. In some examples, other measurements or factors may be used in conjunction with the above-noted measurements, such as a rate of change of pressure in the distribution system, temperature of the water, sensor calibration, etc.

In some instances, based on the distance from the contamination sensor(s) 116 which detected the change in contamination, the leak location module 210 may further analyze the water distribution system data 212 to determine an absolute location of the leak (e.g., longitude/latitude coordinates, GPS coordinates, location defined by the water distribution system 102 layout, etc.). Thus, the absolute location may be used to determine where a leak exists, and enable a utility company to locate the leak without having to dig up extensive portions of the water distribution system 102.

In various examples, the above-noted techniques may be used to determine a location of a leak, such as leak 124. For instance, measurements from the contamination sensor 116 labeled 116(n) may be used in conjunction with measurements from the flow rate sensor 118(3) (or a total flow rate from flow rate sensor(s) 118(1), 118(2), 118(3), and 118(n) depending on the topology of the secondary distribution system 110), to determine a distance from the contamination sensor 116(n) to the leak 124.

In other examples, a second distance calculation may be performed to determine a distance from another contamination sensor 118 to the leak 124. For instance, the contamination measurements from the contamination sensor 116(2) may be used in conjunction with the flow rate measurements from the flow rate sensor 118(2) to determine a distance from the contamination sensor 116(2) to the leak 124. In various instances, the two distances may be used to determine two absolute locations. Using the two absolute locations, a more accurate location of the leak 124 may be determined, such as by averaging the absolute locations. In various examples, the accuracy of absolute locations determined using various contamination sensor(s) 116 may be tracked, and weighting and/or scaling factors may be applied based on errors in the measurements. For instance, if a particular contamination sensor 116 is consistently short on its distance determination, a scaling factor may be applied to its distance determination based on the errors observed overtime. Further, contamination sensor(s) 116 which provide more accurate distance measurements may be weighted more heavily when averaging their absolute location determinations with other absolute location determinations for leaks.

In some examples, the leak location module 210 may further be configured with computer-readable instructions that, when executed by the processor(s) 202, perform a secondary leak location calculation for determining and/or verifying the location of the leak using the techniques described above. Generally, this secondary leak detection calculation is based on the rate of change in contamination measured by the contamination sensor(s) 116, and the amount of water with elevated contamination. When water flows in pipes, the water in the center of the pipe generally has a laminar flow, while water close to the pipe walls have turbulent flow. The turbulent flow slows the water down at the pipe walls, which causes any contamination in the water distribution system 102 to be further spread out through the pipe the further away from the leak the water is measured. Stated otherwise, the turbulent flow will cause contaminants near the pipe walls which enter through a leak in the system 102 to slow down relative to the contaminants in the middle of the pipe, which spreads the contaminants out over a larger distance in the pipes of the water distribution system 102. However, the more water in the pipe, the more quickly the water may be diluted. Accordingly, the pipe diameter or other dimensions may be considered to determine the rate of contamination dilution in the pipe. Thus, based on characteristics of water flow in a pipe, it can be determined that if the contamination sensor(s) 116 detect a rapid rise and fall in contamination with respect to time in the water distribution system 102, the leak may be relatively close to the respective contamination sensor 116, and if the contamination sensor(s) 116 detect a slow, gradual rise in contamination, the leak may be further away from the respective contamination sensor. In this way, a distance away from the contamination sensor may be determined or estimated based on the dimensions of the pipe and the rate of change in contamination in the water with respect to time.

In some examples, this estimated or calculated distance may be used to determine the location of the leak on its own. In various examples, this estimated distance may further be used to disqualify location estimates that may be incorrect using the above-described techniques. For instance, if the distance calculation described above based on time of the pressure change and contamination change indicates a leak that is far away from the contamination sensor 116, then that may be disqualified if the contamination sensor 116 detects a high rate of change in contamination. In some examples, the estimated distance may be compared to the determined distance using the techniques described above to determine if a margin of error between the distances is over a threshold value. If the margin of error is above the threshold value, then the determined location of the leak may be adjusted based at least in part on the estimate location.

Example Leak Detection Devices

Figure 3:
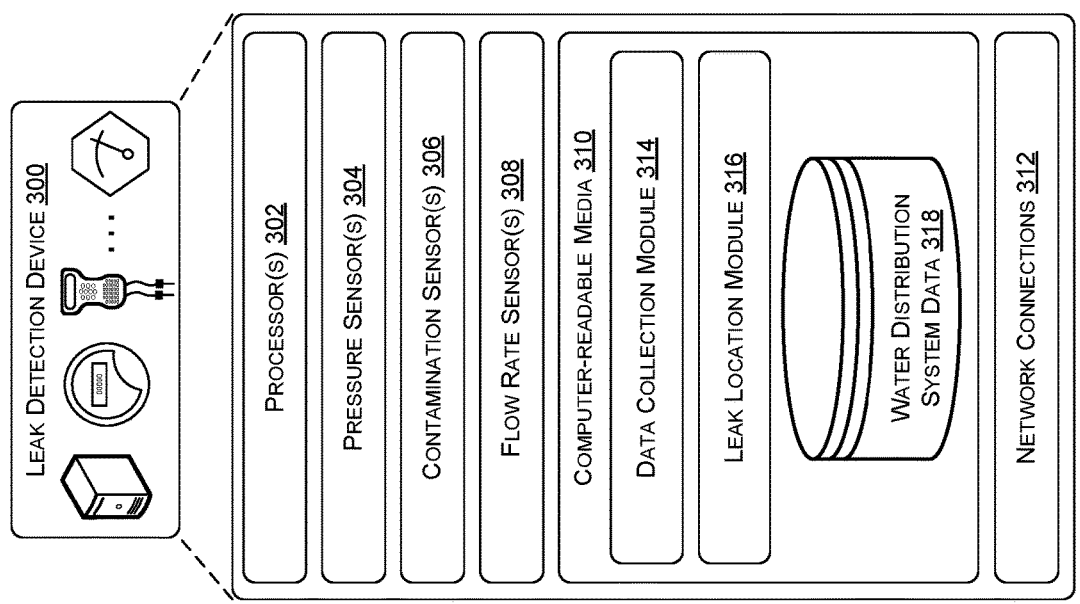
FIG. 3 is a functional block diagram of selected components implemented at a leak detection device on a water distribution system, such as the leak detection device of FIG. 1.

FIG. 3 is a functional block diagram of selected components implemented at a leak detection device 300 on a water distribution system 102. In some examples, the leak detection device 300 may correspond to the leak detection device 126 of FIG. 1. For instance, a time difference between a pressure change and a contamination change in the water distribution system may be determined using pressure sensor data and contamination sensor data. Additionally, flow rate data and/or pipe dimension data for the water distribution system may be determined. Using the time difference and an amount of water that moved through the water distribution system subsequent the pressure drop, a location of a broken pipe may be estimated or determined.

The leak detection device 300 may comprise one or more processors 302, one or more pressure sensors 304, one or more contamination sensors 306, one or more flow rate sensors 308, computer-readable media 310, and one or more network connections 312. The network connections 312 may include one or more network interface controllers (NICs) or other types of transceiver devices to send and receive communications over a network, such as network(s) 120.

The pressure sensors(s) 304 may comprise any type of pressure sensor, such as pressure sensor 114, configured to measure pressure and/or changes in pressure in the water distribution system 102. Similarly, contamination sensor(s) 206 may comprise any type of contamination sensor, such as contamination sensor(s) 116, configured to measure contamination and/or changes in contamination in the water distribution system 102. Further, the flow rate sensor(s) 308 may comprise any type of flow rate sensor, such as flow rate sensor(s) 118, configured to measure flow rates for the water distribution system 102.

Generally, the leak detection device 300 may comprise a portable, or in some examples static, stand-alone device that includes the above-noted sensors for taking measurements on the water distribution system. As illustrated, the various sensors may be housed within the leak detection device 300.

In various examples, the leak detection device 300 further comprises computer-readable media 310 which includes a data collection module 314 and a leak location module 316. The data collection module generally performs operations for obtaining measurements from the sensors of the leak detection device 300 and associated timestamps, similar to the operations performed by the data collection module 210 of the remote leak detection service 122.

Similarly, the leak location module 316 may be configured to, when executed by the processor(s) 302, perform operations for determining a location of a leak in the water distribution system 102. For instance, the leak location module 316 may analyze the measurements obtained by the pressure sensor(s) 304, the contamination sensor(s) 206, and the flow rate sensor(s) 208 to determine a distance from the leak detection device 300 at which a leak exists. The leak location module 316 may generally be configured similar to the leak location module 210 and perform similar operations for determining the location of the leak. In some instances, various data may be stored in the water distribution system data 318, such as pipe dimensions of the water distribution system 102, which are analyzed by the leak location module 316 to determine the distance. For example, the leak detection device 300 may be configured to determine its location (e.g., GPS, cellular network, etc.) and determine corresponding pipe dimensions in the water distribution system data 318 which are associated with a pipe at that location. In some instances, the leak location module 316 may not have access to water distribution system data 318 however, and simply use a default pipe dimension to determine the location of the leak. In some instances, one or more dimensions of one or more pipes may be used to determine the location of the leak. For instance, multiple pipes that are interconnected in the water distribution system may be mathematically combined to determine equivalent pipe dimensions. In this way, pipe dimensions which vary in pipes between a leak and a contamination sensor and/or flow sensor may be combined to determine an equivalent pipe dimension used to calculate the location of the leak.

In some instances, the leak location module 316 may perform part, or all, of the operations performed by the leak location module 210. For instance, the leak location module 316 may simply take measurements using the various sensors and upload that data to the remote leak detection service 122. In such an example, the leak location module 316 may not perform all the calculations performed by the leak location module 210, but instead serves as an aggregator. In some examples, the leak location module 316 may determine the distance from the leak detection device 300 to the leak and send that distance measurement to the remote leak detection service 122 for further use. In some examples, the leak location module 316 may determine the absolute location of the leak using techniques similar to those performed by the leak location module 210, and based on a layout of the water distribution system 318 which may be included in the water distribution system data 318.

In some instances, multiple leak detection devices 300 may be positioned on the water distribution system 102 which are configured to communicate data with each other. For example, the leak detection devices 300 may send measurements, distance calculations to leaks, or absolute positions of leaks to each other or to the remote leak detection service 122. Similar to the techniques described above performed by the leak location module 210 for averaging or combining multiple distance calculations and/or absolute positions, the leak location module 316 of the leak detection devices 300 may also determine an aggregate or combined absolute location.

In various instances, one or more of the pressure sensor(s) 304, contamination sensor(s) 306, and flow rate sensor(s) 308 may be exterior to a housing the leak detection device 300. For instance, one or more of the pressure sensor(s) 304, contamination sensor(s) 306, and flow rate sensor(s) 308 may be communicatively coupled to the leak detection device 300, such as through a cable or over one or more networks, to send measurements to the leak detection device 300.

Figure 4:
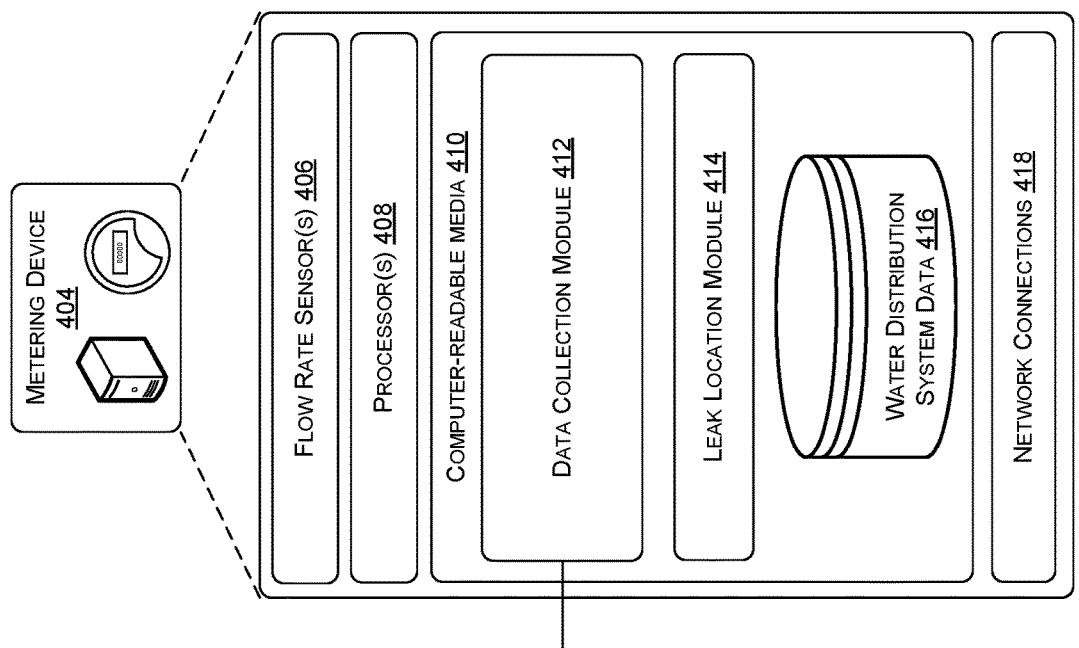
FIG. 4 is a functional block diagram of selected components implemented at a leak detection device on a water distribution system where various sensors are exterior to the housing of the leak detection device.

FIG. 4 is a functional block diagram of selected components implemented at a leak detection device 400 on a water distribution system 102 where various sensors included in a leak detection device 400, which is coupled to a metering device 402.

As illustrated, the leak detection device 400 of FIG. 4 may include one or more sensors 402, such as a pressure sensor 402(1), and a contamination sensor 402(2). In such examples, the leak detection device 400 may comprise a portable device, such as a handheld device, which can connect, such as through a cable or over a network, to a metering device 404. Generally, the metering device may comprise a device located on the water distribution system which takes measurements using one or more flow rate sensor(s) 406 for the water distribution system.

The metering device 404 may comprise one or more processors 408, computer-readable media 410, and network connections 418. The computer-readable media 410 may store a data collection module 412 which is communicatively coupled to the leak detection device 400 to receive measurements or other data from the pressure sensor 402(1) and the contamination sensor 402(2). As illustrated in FIG. 4, the pressure sensor 402(1) and the contamination sensor 402(2) are located exterior to the metering device 404, but are still coupled to the metering device 404. For instance, leak detection device 400 may be plugged into various input ports on the metering device 404 to communicate measurements, or coupled over a short-range wireless communication network (e.g., Bluetooth®, ZigBee®, etc.). The data collection module 412 and leak location module 414 may generally perform operations similar to those described for the data collection module 316 and the leak location module 316.

In some examples, all or portions of the data collection module 412, leak location module 414, and/or water distribution system data 416 may be stored on and operated by the leak detection device 400. For instance, the leak detection device 400 may simply "plug into" the metering device 404 and use the network connections 418 or other communication capabilities of the metering device 402 for sending data. The leak detection device 400 may include one or more of the processors 408 to execute the data collection module 412 and leak location module 414.

The computer-readable media 204, 310, and 410 may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier wave.

Example Flow Diagrams

Figure 5:
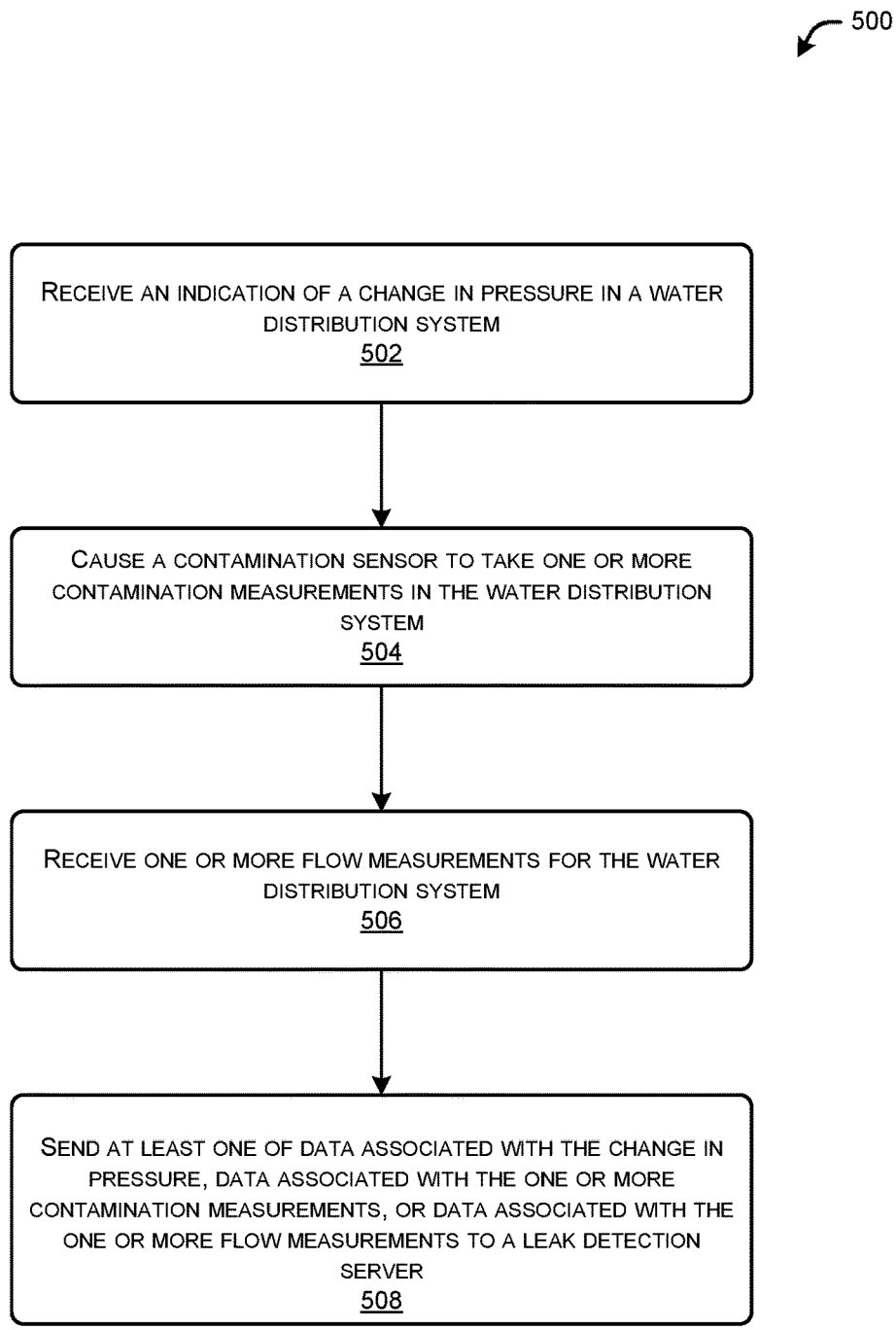
FIG. 5 is a flow diagram of an example process for receiving measurements from various sensors on a water distribution system and relaying data representing the measurements to a remote leak detection service.
Figure 6:
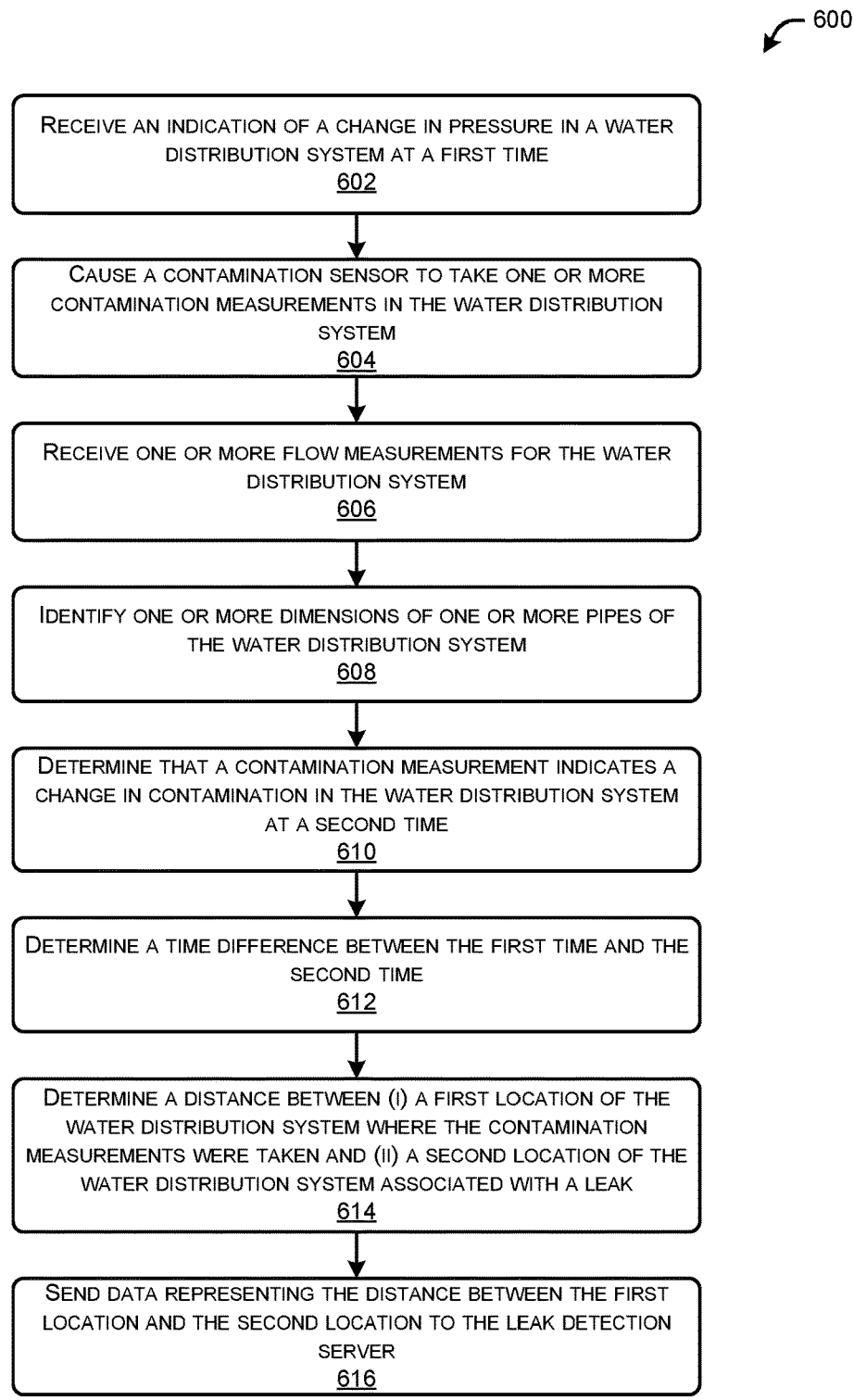
FIG. 6 is a flow diagram of an example process for receiving measurements from various sensors on a water distribution system, determining a distance between a contamination sensor and a leak in the water distribution system, and sending data representing the distance to a remote leak detection service.
Figure 7:
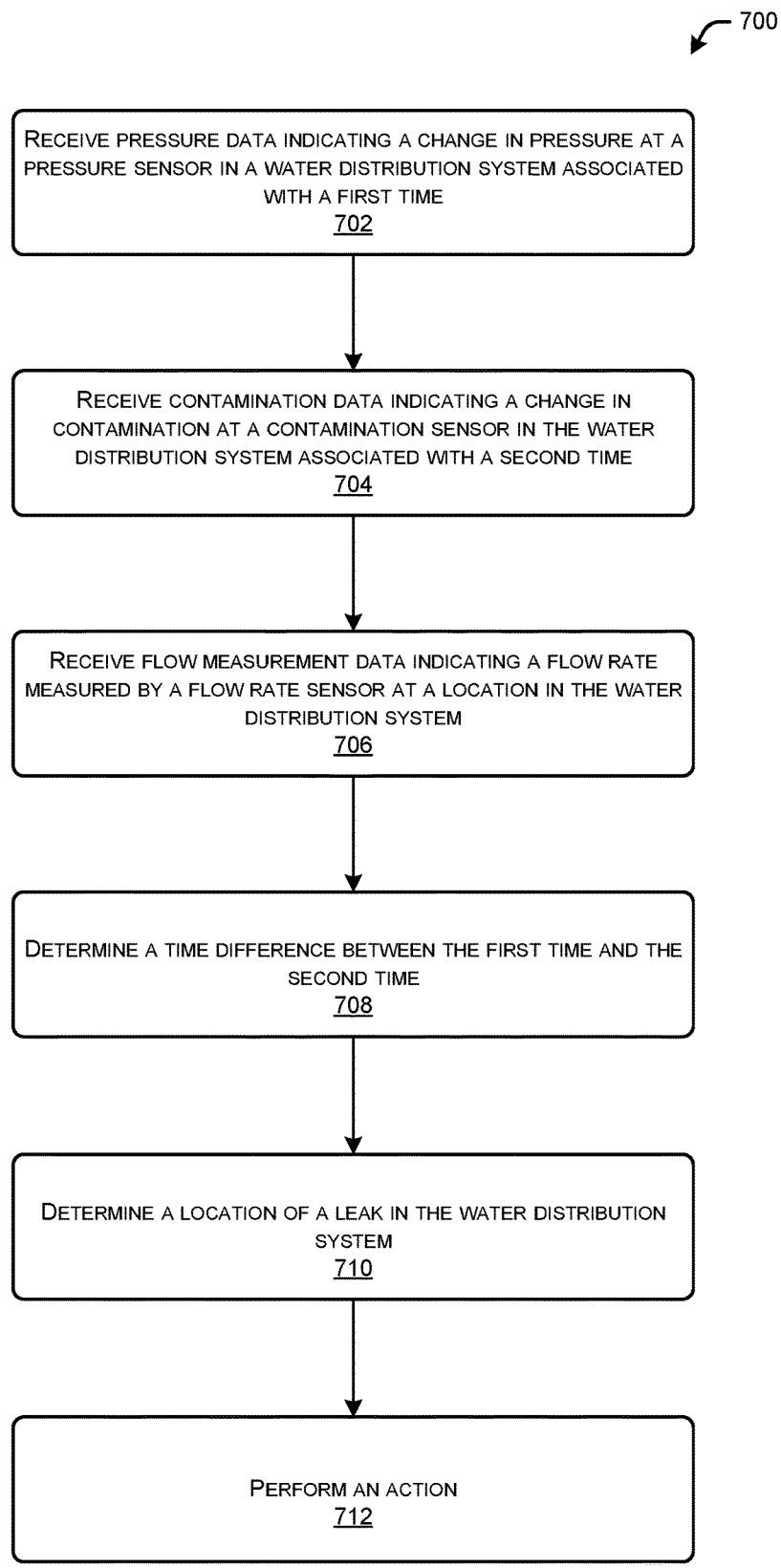
FIG. 7 is a flow diagram of an example process for receiving measurements from various sensors on a water distribution system and determining a location of a leak in the water distribution system.

FIGS. 5-7 are flow diagrams illustrating example processes according to the techniques described herein. The flow of operations in each example process is illustrated as a collection of blocks and/or arrows representing a sequence of operations that can be implemented in hardware, software, firmware, or a combination thereof. The order in which the blocks are described is not intended to be construed as a limitation, and any number of the described operations can be combined in any order to implement one or more methods, or alternate methods. Additionally, individual operations may be omitted from the flow of operations without departing from the spirit and scope of the subject matter described herein. In the context of software, the blocks represent computer instructions that, when executed by one or more processors, perform the recited operations. In the context of hardware, the blocks may represent one or more circuits (e.g., application specific integrated circuits—ASICs) configured to execute the recited operations.

FIG. 5 is a flow diagram of an example process 500 for receiving measurements from various sensors on a water distribution system and relaying data representing the measurements to a remote leak detection service, such as remote leak detection service 122. In some examples, modules of the leak detection device(s) 126, 300, and/or 400 may perform the operations of process 500 (e.g., data collection module(s) 314 and/or 412, leak location module 316 and/or 414, etc.).

At 502, the process 500 may receive an indication of a change in pressure in a water distribution system. In some examples, the indication of the change in pressure may comprise data measurements taken by a pressure sensor over a period of time. In various examples, the indication of the change in pressure may simply comprise a notification or beacon indicating that a pressure change has occurred. In some instances, the indication of the change in pressure may be associated with one or more timestamps indicating a time at which the change in pressure occurred. The change in pressure may indicate that contaminants have entered a water distribution system through a break in a pipe of the system.

At 504, the process 500 may cause a contamination sensor to take one or more contamination measurements in the water distribution system. In various examples, the contamination sensor may be caused to take the one or more contamination measurements based on, or in response to, receiving the indication of the change in pressure in the water distribution system. In some instances, the one or more contamination measurements may be associated with timestamps at which the measurements were taken. The change in contamination may indicate that the contaminants that entered the water distribution system have reached the contamination sensor.

At 506, the process 500 may receive one or more flow measurements for the water distribution system. In some instances, receiving the one or more flow rate measurements may comprise querying or requesting a flow rate sensor to provide the one or more flow rate measurements. The flow measurements may indicate a rate or speed at which the contaminants moved through the water distribution system.

At 508, the process 500 may send at least one of data associated with the change in pressure associated with the first time, data associated with the one or more contamination measurements, or data associated with the one or more flow measurements to a leak detection server. In some instances, the data may represent raw sensor measurements and, in some examples, associated timestamps. The raw sensor data may comprise measurements determined by the various sensors, such as magnitudes, or rounded or otherwise filtered, compresses, and/or reformatted measurements from the various sensors. In various examples, the data sent to the leak detection service may comprise a distance measurement between a location associated with the one or more contamination measurements and another location associated with a leak in the water distribution system. The remote leak detection service may use the various data to determine a location of a break in a pipe causing a leak in the water distribution system.

FIG. 6 is a flow diagram of an example process 600 for receiving measurements from various sensors on a water distribution system, determining a distance between a contamination sensor and a leak in the water distribution system, and sending data representing the distance to a remote leak detection service. In some examples, modules of the leak detection device 126 may perform the operations of process 600 (e.g., data collection module(s) 314 and/or 412, leak location module 316 and/or 414, etc.).

At 602, the process 600 may receive an indication of a change in pressure in a water distribution system at a first time. The indication of the pressure change may be associated with a time at which contaminants have entered the water distribution system. At 604, the process 604 may cause a contamination sensor to take one or more contamination measurements in the water distribution system. The contamination sensor may determine a change in contaminants, such as an increase, which indicates that the contaminants that entered the system due to the pressure change have reached the contamination sensor. At 606, the process 600 may receive one or more flow measurements for the water distribution system. The flow measurements may indicate a rate or speed at which the contaminants moved through the water distribution system.

At 608, the process 600 may identify one or more dimensions of one or more pipes of the water distribution system, such as by analyzing water distribution system data which stores dimensions of pipes in the water distribution system and/or a layout of pipes in the water distribution system. In some examples, identifying the dimensions of the one or more pipes may comprise querying or analyzing a data structure storing the dimensions. In other examples, identifying the dimensions may comprise having a field agent measure dimensions of the one or more pipes. The dimension may comprise a dimension of a single pipe, dimensions of multiple pipes, or equivalent dimensions of a composite of multiple pipes.

At 610, the process 600 may determine that a contamination measurement of the one or more contamination measurements indicates a change in contamination in the water distribution system that occurred at a second time subsequent the first time. The second time indicates the time at which the contaminants reached the contamination sensor.

At 612, the process 600 may determine a time difference between the first time associated with the change in pressure and the second time associated with the change in contamination. Generally, the first time and the second time may be anytime near or representative of the changes in pressure and contamination, respectively. The time difference may indicate an amount of time taken for the contaminants to move from a break in a pipe of the water distribution system to a contamination sensor which detected the contaminants.

At 614, the process 600 may determine a distance between (i) a first location of the water distribution system where the contamination measurements were taken, and (ii) a second location of the water distribution system associated with a leak. For instance, the flow rate may indicate a speed at which the contaminants where moving through the system, and the time difference may indicate how long the contaminants were moving at that speed before reaching the contamination sensor. The speed and length of time may be used to determine a distance the contaminants traveled before reaching the contamination sensor.

At 616, the process 600 may send data representing the distance between the first location and the second location to the leak detection service. For instance, the process 600 may send information regarding the location of the contamination sensor and the location of the leak or break in the pipe.

FIG. 7 is a flow diagram of an example process 700 for receiving measurements from various sensors on a water distribution system and determining a location of a leak in the water distribution system. In some examples, the operations described herein may be performed by various modules or components of the remote leak detection service 122 and/or the leak detection device 126.

At 702, the process 700 may receive pressure data indicating a change in pressure at a pressure sensor in a water distribution system. The change in pressure may be associated with a first time, which may correspond to a drop in pressure, a rise in pressure, or a time otherwise representing a change in pressure. In some instances, the pressure data, and associated timestamp information, may be received over a network from the pressure sensor and/or a leak detection device. The change in pressure may indicate a point in time at which contaminants were able to enter the water distribution system.

At 704, the process 700 may receive contamination data indicating a detected change in contamination at a contamination sensor in the water distribution system. In various instances, the change in contamination may be associated with a second time. For instance, timestamps may be associated with contamination data which illustrate the change in contamination. In some examples, the contamination data may comprise a plurality of contamination measurements with associated timestamps, or an indication of a time at which a change in contamination occurred. In some instances, the contamination data may be received over a network and from a contamination sensor, and/or a leak detection device. The contamination data may indicate a point in time at which the contaminants reached a contamination sensor after entering the water distribution system.

At 706, the process 700 may receive flow measurement data indicating a flow rate measured by a flow rate sensor for the water distribution system. In some instances, the flow measurement data may correspond to a flow rate near a contamination sensor which sent the contamination data. In various examples, the flow measurement data may indicate a flow rate subsequent to the change in pressure. The flow measurement data may indicate how fast the contaminants moved through the system after entering the system and before being detected by a contamination sensor.

At 708, the process 700 may determine a difference between the first time associated with the change in pressure and the second time associated with the change in contamination. This time may indicate the total time it took for contaminants to reach a contamination sensor after entering the water distribution system.

At 710, the process 700 may determine a location of a leak in the water distribution system. The determination of the location of the leak may be based at least in part on the time difference and the flow rate for the water distribution system. In some instances, the determination may further be based on one or more dimensions of one or more pipes in the water distribution system. For instance, if varying size pipes are used, a composite dimension representing the pipes may be determined.

At 712, the process 700 may perform an action based at least in part on determining the location of the leak in the water distribution system. For instance, the process 700 may output an indication of the location of the leak using a display. Additionally, or alternatively, the process 700 may send a notification to a computing device indicating the presence of the leak and/or the location of the leak. In some instances, the process 700 may send an instruction to a computing device for a user of the computing device to repair the leak in the water distribution system, as well as an indication of the location of the leak. In further examples, one or more valves (e.g., solenoid valves) may be positioned on the water distribution system. Based on the location of the leak, the process 700 may send an electrical signal to one or more of the valves to cut off the water supply to various regions of the water distribution system to prevent spread of any potential contamination.

CONCLUSION

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A leak detection device comprising:
   one or more processors;
   one or more computer-readable media storing computer-executable instructions that, when executed on the one or more processors, cause the one or more processors to perform acts comprising:
      receiving, from a pressure sensor on a water distribution system, an indication of a change in pressure in the water distribution system, wherein the change in the pressure is associated with a first time;
      based at least in part on receiving the indication of the change in the pressure in the water distribution system, causing a contamination sensor associated with the leak detection device to take one or more contamination measurements in the water distribution system;
      receiving, from a flow measurement sensor on the water distribution system, one or more flow measurements in the water distribution system; and
      at least one of
         detecting a location of a leak in the water distribution system based on the change in pressure, the one or more contamination measurements, and the one or more flow measurements; or
         transmitting data associated with the change in pressure, the one or more contamination measurements, and the one or more flow measurements, associated with a location of a leak, to a remote leak detection service.

2. A leak detection device as claim 1 recites, the acts further comprising:
   identifying one or more dimensions of one or more pipes of the water distribution system;
   determining that a contamination measurement of the one or more contamination measurements indicates a change in contamination in the water distribution system, the contamination measurement being taken at a second time;
   determining a time difference between the first time and the second time; and
   determining, based at least in part on the time difference, the one or more dimensions of the one or more pipes, and the one or more flow measurements, a distance between (i) a first location of the water distribution system where the contamination measurement was taken and (ii) a second location of the water distribution system associated with the leak in the water distribution system.

3. A leak detection device as claim 2 recites, the acts further comprising receiving, from at least one of the contamination sensor or another contamination sensor, a reference contamination measurement for the water distribution system;
   wherein determining that the contamination measurement of the one or more contamination measurements indicates the change in contamination in the water distribution system comprises:
   determining that the contamination measurement indicates a change in contamination in the water distribution system with respect to the reference contamination measurement.

4. A leak detection device as claim 1 recites, the acts further comprising sending at least one of data associated with the change in pressure associated with the first time, data associated with the one or more contamination measurements, or data associated with the one or more flow measurements to a leak detection server.

5. A leak detection device as claim 1 recites, wherein:
   the leak detection device further comprises:
   the pressure sensor;
   the flow measurement sensor; and
   the contamination sensor; and
   receiving the indication of the change in the pressure in the water distribution system comprises detecting, by the pressure sensor, a drop in the pressure in the water distribution system.

6. A leak detection device as claim 1 recites, wherein:
   the leak detection device comprises:
   the pressure sensor; and
   the contamination sensor; and
   the leak detection device is communicatively coupled to a metering device on the water distribution system which includes the flow measurement sensor.

7. A system comprising:
   one or more processors;
   one or more computer-readable media storing computer-executable instructions that, when executed on the one or more processors, cause the one or more processors to perform acts comprising:
      receiving, over one or more networks, pressure data indicating a change in pressure at a pressure sensor in a water distribution system, the change in pressure associated with a first time;
      receiving, over the one or more networks, contamination data indicating a change in contamination at a contamination sensor in the water distribution system, the change in contamination being associated with a second time subsequent the first time;

receiving, over the one or more networks, flow measurement data indicating a flow rate measured by a flow rate sensor at a location in the water distribution system; and determining, based at least in part on the pressure data, the contamination data, and the flow measurement data, a location of a leak in the water distribution system.

8. A system as claim 7 recites, the acts further comprising identifying one or more dimensions of one or more pipes of the water distribution system; and
wherein determining the location of the leak in the water distribution system comprises:
determining a time difference between the first time and the second time;
determining an amount of water that flowed by the contamination sensor between the first time and the second time based at least in part on the flow measurement data; and
determining a distance from a location of the contamination sensor to the leak based at least in part on the one or more dimensions of the one or more pipes, the time difference, and the amount of water that flowed between the first time and the second time.

9. A system as claim 7 recites, wherein the pressure data, the contamination data, and the flow measurement data are received from a metering device coupled to the pressure sensor, contamination sensor, and flow rate sensor.

10. A system as claim 7 or 8 recites, wherein the pressure data and the contamination data are received from a mobile leak detection device including the pressure sensor and the contamination sensor.

11. A system as claim 7 recites, the acts further comprising at least one of:
outputting, by a display associated with the system, an indication of the location of the leak in the water distribution system;
sending a notification to a computing device indicating a presence of the leak in the water distribution system; or
sending, to a mobile computing device associated with a user, an instruction for the user to repair the leak in the water distribution system.

12. A system as claim 7 recites, wherein determining the location of the leak in the water distribution system comprises determining a distance from a measurement location at which a contamination measurement in the contamination data was obtained to a location along a pipe of the water distribution system that is associated with the leak.

13. A system as claim 7 recites, the acts further comprising identifying a reference contamination measurement for the water distribution system; and
wherein determining the location of the leak in the water distribution system comprises:
analyzing the contamination data to identify:
a period of time during which contamination measurements included in the contamination data are higher than the reference contamination measurement;
a rate of change in the contamination measurements over the period of time; and
an amount of water in the water distribution system that has the contamination measurements higher than the reference contamination measurement; and
determining a distance from a location of the contamination sensor to the leak based at least in part on the period of time, the rate of change in the contamination measurements, and the amount of water that has the contamination measurements higher than the reference contamination measurement.

14. A system as claim 7 recites, wherein the contamination sensor comprises a first contamination sensor and the flow rate sensor comprises a first flow rate sensor; and
the acts further comprising:
receiving, from a second contamination sensor on the water distribution system, additional contamination data indicating another detected change in contamination in the water distribution system, the other detected change in contamination associated with a third time subsequent the first time;
receiving, from a second flow rate sensor on the water distribution system, additional flow measurement data indicating another flow rate measurement by the second flow rate sensor at another location in the water distribution system;
determining another time difference between the first time and the third time;
determining, based at least in part on the other time difference and the other flow rate for the other location in the water distribution system, an estimated location of the leak in the water distribution system; and
determining, based at least in part on the location of the leak and the estimated location of the leak, a final location of the leak in the water distribution system.

15. A method comprising:
receiving, from a pressure sensor on a water distribution system, pressure data indicating a change in pressure in the water distribution system, wherein the change in pressure is associated with a first time;
receiving, from a contamination sensor on the water distribution system, contamination data indicating a detected change in contamination in the water distribution system, wherein the change in contamination is associated with a second time;
receiving, from a flow rate sensor on the water distribution system, flow rate data indicating a flow rate for the water distribution system;
determining a time difference between the first time and the second time; and
determining, based at least in part on the time difference and the flow rate data, a location of a leak in the water distribution system.

16. A method as claim 15 recites, further comprising identifying a dimension of one or more pipes of the water distribution system, wherein,
the determining the location of the leak in the water distribution system is further based at least in part on the dimension of the one or more pipes of the water distribution system.

17. A method as claim 15 recites, wherein determining the location of the leak in the water distribution system comprises determining a distance between a first location of the water distribution system associated with the contamination sensor and a second location of the water distribution system associated with the leak in the water distribution system.

18. A method as claim 15 recites, further comprising at least one of:
outputting an indication of the location of the leak in the water distribution system to a computing device;
sending, to a mobile computing device associated with a user, an instruction for the user to repair the leak in the water distribution system; or
outputting a signal to a valve on the water distribution system to cause the valve to close to prevent water from flowing into a portion of the water distribution system.

19. A method as claim 15 recites, wherein:
the change in pressure comprises a drop in pressure in the water distribution system; and
the change in contamination comprises a rise in contamination in the water distribution system.

20. A method as claim 15 recites, wherein the contamination sensor comprises a first contamination sensor and the flow rate sensor comprises a first flow rate sensor; and
the method further comprising:
receiving, from a second contamination sensor on the water distribution system, additional contamination data indicating another detected change in contamination in the water distribution system, the other detected change in contamination associated with a third time subsequent the first time;
receiving, from a second flow rate sensor on the water distribution system, additional flow measurement data indicating another flow rate measurement by the second flow rate sensor at another location in the water distribution system;
determining another time difference between the first time and the third time;
determining, based at least in part on the other time difference and the other flow rate for the other location in the water distribution system, an estimated location of the leak in the water distribution system; and
determining, based at least in part on the location of the leak and the estimated location of the leak, a final location of the leak in the water distribution system.

* * * * *